UNITED STATES PATENT OFFICE.

JAMES H. GRAVELL, OF ELKINS PARK, PENNSYLVANIA, ASSIGNOR TO THOMSON ELECTRIC WELDING COMPANY, OF BOSTON, MASSACHUSETTS, A CORPORATION OF MASSACHUSETTS.

METHOD OF RESISTANCE WELDING.

1,342,957.     Specification of Letters Patent.     Patented June 8, 1920.

No Drawing.     Application filed July 11, 1919. Serial No. 310,192.

*To all whom it may concern:*

Be it known that I, JAMES H. GRAVELL, a citizen of the United States, and a resident of Elkins Park, in the county of Montgomery and State of Pennsylvania, have invented certain new and useful Improvements in Methods of Resistance Welding, of which the following is a specification.

This invention relates to resistance welding. As is now well known, resistance welding employs an electric current, the resistance to the passage of which through the work causes the work to rise to a welding temperature, at which time pressure is applied to complete the weld.

Although the present invention can be used to advantage in any of the forms of resistance welding, it is especially useful in butt welding; its great advantage being demonstrated when butt-welding tubes, high-speed steel to low-carbon steel, and when welding cast metal to wrought metal or steel.

In the well-known process of resistance welding, the parts to be welded are brought into contact, the current applied and the parts pressed in contact until the metal adjacent to the joint is properly heated. When the proper temperature has been attained, the parts are forced together to upset the heated portions at the joint and complete the weld. In this form of welding large volumes of current are used at very low voltages; as an example, when butt-welding two bars together of about one inch in diameter, a current of about 10,000 amperes is used, and the voltage across the jaws or clamps of the welding machine, during the welding operation, is about one or two volts. This form of welding is satisfactory where work is "stocky" and where the thermal characteristics of the opposing portions of the work are the same; that is, when the opposing ends of the work are the same size, shape and quality, so that equal heating will result in both of the opposing ends at the same time. Where the work is tubular in shape, or "flimsy" in structure, or where the opposing ends are of different thermal characteristics, the process is not entirely satisfactory. In the case of welding tubes, the side of the tube nearest the transformer becomes more highly heated than the opposite side; when welding wide thin sheets, the section is not strong enough to withstand the necessary pressure to insure an even distribution of current; when welding high-speed steel to machine steel, the high-speed steel is burned before the machine steel has attained the proper welding temperature; when welding cast iron to wrought iron or steel, the cast iron melts before the wrought iron or steel has been brought up to the welding heat. Another characteristic of the well-known resistance process is that, although the heating effect depends on the resistance of the portion of the work through which the current flows, the resistance is extremely low. This results in greatly reducing the power-factor of the apparatus employed in the welding and thus greatly limiting the output of the apparatus relative to the cross-sections of the work.

The object of my improved resistance welding process is to overcome the limitations and objections mentioned above, so that (1) there will be an even distribution of heat in butt-welding the ends of tubes; (2) the ends of thin wide sheets may be evenly heated; (3) high-speed steel may be welded to machine steel; (4) large sections may be welded to smaller sections; (5) cast iron may be welded to wrought iron; and (6) so that the power-factor will be improved and the output of the apparatus enlarged.

According to the present process, in the preferred manner of carrying it into effect I bring the opposed ends of the work into contact and establish the welding current in the usual way by closing the primary switch. As soon as the welding current is established, I manipulate the upsetting lever to relieve all pressure between the opposed ends of the work, so that a sparking or arcing contact between the said ends results. This sparking or arcing contact is continued, without pressing the parts together, by slowly feeding the parts of the work together by means of the upsetting lever, until the opposed ends of the work are in a fluid state and the metal immediately back of the ends is at a welding temperature. When this condition has been attained, the heated ends of the work are forcibly pressed together, preferably by forcing one of the pieces of work toward the other by means of the upsetting lever. This results in extruding the overheated metal and welding the parts together.

In practising this process, the operation is accompanied by a copious supply of scintillating particles of the work thrown off from between the opposing surfaces of the work, giving much the same appearance as the eruption produced in cutting steel by the oxygen blow-pipe.

The process may be carried out in any suitable standard type of welding machine in which the two parts to be welded are firmly clamped in jaws forming the terminals of the transformer secondary. These machines are now so well known and their details so well understood in the art that illustration herein is deemed unnecessary and superfluous.

The sparking or arcing contact or position of the parts of the work maintained in the first part of my process increases the resistance of the joint without materially reducing the current flow and, therefore, works to advantage in shortening the time required for the application of the current and in improving the power-factor of the welding apparatus. The sparking or arcing method used by me, by increasing the heating effect and improving the power-factor, enables relatively large work to be welded on a relatively small welding machine; for instance, if a welding machine had been designed to weld 1-inch bars by the regular resistance method, the same machine will readily weld 1½-inch bars when my method is employed. When welding tubing by the well-known resistance method, the part of the tube nearest the transformer becomes much hotter than the part away from the transformer. This is due to the fact that the current tends to take the path of least resistance, or the shortest path, which is that nearest the transformer. When the present process is used, the increased resistance of the sparking or arcing joint tends to make both paths of equal resistance and, therefore, equalizes the distribution of the current and produces an even distribution of heat.

Although the process can be, and preferably is, carried out on a standard resistance welding machine, the voltage across the welding terminals when carrying out this improved process is much higher than when the regular resistance process is used; in other words, the voltage drop on closed circuit amounts to very little when my process is used. According to the old process of resistance welding, all of the metal between the clamps becomes heated; when my process is used it is simply the ends of the work which become heated,—that is, the heat does not extend back to the clamps. This characteristic is used to advantage in welding thin, wide sheets. The fact that the major portion of the metal between the clamps remains practically cold adds sufficient stiffness to the thin sheets, so that the opposing surfaces remain in line, and, as the current is evenly distributed, the welds produced are uniform and strong. As the heat is developed very quickly in this process, the thermal characteristics of the opposing ends of the work become a less important factor than in ordinary resistance welding, for the actual amount of heat escaping by the good conductor of heat will not be much greater than the amount of heat escaping by the poor conductor of heat, because the time element has been reduced to a minimum; the two surfaces, therefore, attain an equal temperature in practically the same time, which is the ideal condition for successful welding. This characteristic shows its advantage in welding a piece of large cross-section to a piece of smaller cross-section.

What I claim as my invention is:—

1. The method of resistance welding consisting in abutting the ends of the work without pressure, passing an electric current across the abutted ends to establish a sparking or arcing from one to the other until the ends have reached a welding temperature, and then applying a heavy pressure to weld the ends together.

2. The method of resistance welding consisting in bringing the ends of the work into contact, establishing an electric sparking or arcing contact between the abutted ends, maintaining said sparking or arcing contact until the ends have reached a welding temperature, and then applying pressure to upset the work and complete the weld.

3. The method of resistance welding consisting in abutting the ends of the work, establishing an electric sparking or arcing contact between said ends, causing the work to follow up as portions burn away and at the same time maintaining the sparking or arcing contact until the ends have reached a welding temperature, and then applying a heavy upsetting pressure to force the parts together and complete the weld.

4. The method of resistance welding consisting in bringing the parts to be welded into contact, establishing a sparking or arcing contact between the parts, maintaining the arcing contact by slowly causing one part to approach the other part without pressure until the opposing surfaces have been raised to a welding temperature and then forcibly pressing the parts together to complete the weld.

Signed at New York, in the county of New York and State of New York this 10th day of July, A. D. 1919.

JAMES H. GRAVELL.

Witnesses:
F. B. TOWNSEND,
GEORGE E. BROWN.